United States Patent
Swindell et al.

(10) Patent No.: US 6,991,051 B2
(45) Date of Patent: Jan. 31, 2006

(54) ALL ELECTRIC MOTOR VEHICLE

(76) Inventors: Edward LeRoy Swindell, P.O. Box 36, Millbrook, NY (US) 12545; Stephen Galatti, Jr., P.O. Box 1433, Millbrook, NY (US) 12545

( * ) Notice: Subject to any disclaimer, the term of this patent is extended or adjusted under 35 U.S.C. 154(b) by 567 days.

(21) Appl. No.: 09/922,304

(22) Filed: Jan. 22, 2002

(65) Prior Publication Data

US 2004/0040755 A1 Mar. 4, 2004

(51) Int. Cl.
*B60K 1/00* (2006.01)

(52) U.S. Cl. .................... 180/65.1; 180/65.3; 180/65.8; 318/53

(58) Field of Classification Search ............ 280/65.1, 280/65.2, 65.3, 65.4, 65.5; 318/52, 53, 63, 318/75, 83, 93, 111, 139
See application file for complete search history.

(56) References Cited

U.S. PATENT DOCUMENTS

| | | | | |
|---|---|---|---|---|
| 4,363,999 A | * | 12/1982 | Preikschat | 318/53 |
| 4,471,273 A | * | 9/1984 | Melocik et al. | 318/55 |
| 4,814,631 A | * | 3/1989 | Jackson | 318/139 |
| 5,432,418 A | * | 7/1995 | Jeanneret | 318/52 |
| 5,481,460 A | * | 1/1996 | Masaki et al. | 701/50 |
| 5,512,022 A | * | 4/1996 | Suzuki | 475/2 |
| 5,701,062 A | * | 12/1997 | Barrett | 318/51 |
| 6,028,404 A | * | 2/2000 | Yang | 318/111 |
| 6,089,341 A | * | 7/2000 | Gingerich | 180/65.1 |
| 6,105,696 A | * | 8/2000 | Chen | 180/65.1 |
| 6,175,217 B1 | * | 1/2001 | Da Ponte et al. | 322/19 |
| 6,491,120 B1 | * | 12/2002 | Ogburn | 180/65.2 |
| 6,586,668 B2 | * | 7/2003 | Shugar et al. | 180/65.1 |

\* cited by examiner

*Primary Examiner*—Hau Phan
(74) *Attorney, Agent, or Firm*—Milde & Hoffberg, LLP

(57) ABSTRACT

An improved battery powered four wheel multi-speed all electric motor car, used to move personnel and powered by two multi-wound electric motors connected in tandem so that by engaging the controls three speeds may be achieved. The forward and reverse of the vehicle is accomplished by moving a forward and reverse switch before staring the vehicle by engaging the operating switch. The electrical supply for the vehicle is furnished by batteries charged by a standby rectifier when vehicle is not in use and with solar panel and fuel cell interfacing during daytime operation and the quick removable batteries and hydrogen tanks at exchange stations, if desired by the operator of the vehicle, adds to the uniqueness of our invention by adding to the art of unlimited speed and distance. The interchangeable system of the batteries and the hydrogen tanks on travel routes and the ease which these components can be installed, removed from and replaced in our motor car adds to the many aptitudes of this motor car and to its uniqueness.

9 Claims, 5 Drawing Sheets

POSITION 1 (LOW SPEED)

POSITION 2 (MEDIUM SPEED)

POSITION 3 (HIGH SPEED)

ALL ELECTRIC MOTOR VEHICLE

BACKGROUND OF THE INVENTION

The specific field of this Invention is an all-electric car, resembling the size and shape of most of the modern cars and other contemporary vehicles. There is presently no method in the art which would allow for the higher and greater travel distance as our vehicle and the low current consumption characteristics make our invention very desirable in solving the pollution problem and at the same time it is very sound environmentally and the fuel supply problem does not exist with our invention.

SUMMARY OF THE INVENTION

Our invention is a battery powered multi-speed four-wheeled vehicle capable of carrying passengers for significantly greater distance than that previously practiced in the arts; indeed, the nonpolluting advantage of this invention outweighs those of competing vehicles powered in whole or in part by engines consuming diesel, alcohol or gasoline.

According to the invention, the drive system for the motor vehicle includes two DC electric series motors coupled mechanically to rotate together and coupled mechanically to the drive wheels of the motor vehicle. Each of these motors has a pair of electrical power terminals. The drive system further includes an electric switch for electrically connecting DC input power leads L1 and L2 to the pairs of power terminals of the two motors. When in a first mode, the switch connects the power terminals of the two motors in series between the power leads L1 and L2. When in a second mode, the switch connects the power terminals of the two motors in parallel between the power leads L1 and L2. The two motors thus operate in a low speed range when the switch is in the first mode and in a higher speed range when the switch is in the second mode.

In addition, one or both of the two motors has an electric shunt field winding and the switch is operable, when in a third mode, to connect the shunt field winding of one or both motors to the power leads L1 and L2. When in this third mode, one or both motors operate in still another speed range, which may be higher than the speed ranges of the first and second modes.

BRIEF DESCRIPTION OF THE DRAWINGS

The accompanying drawings show an embodiment of our invention and modification of a side view of the longitudinal Section and a back elevation view of that section.

Figure 1:
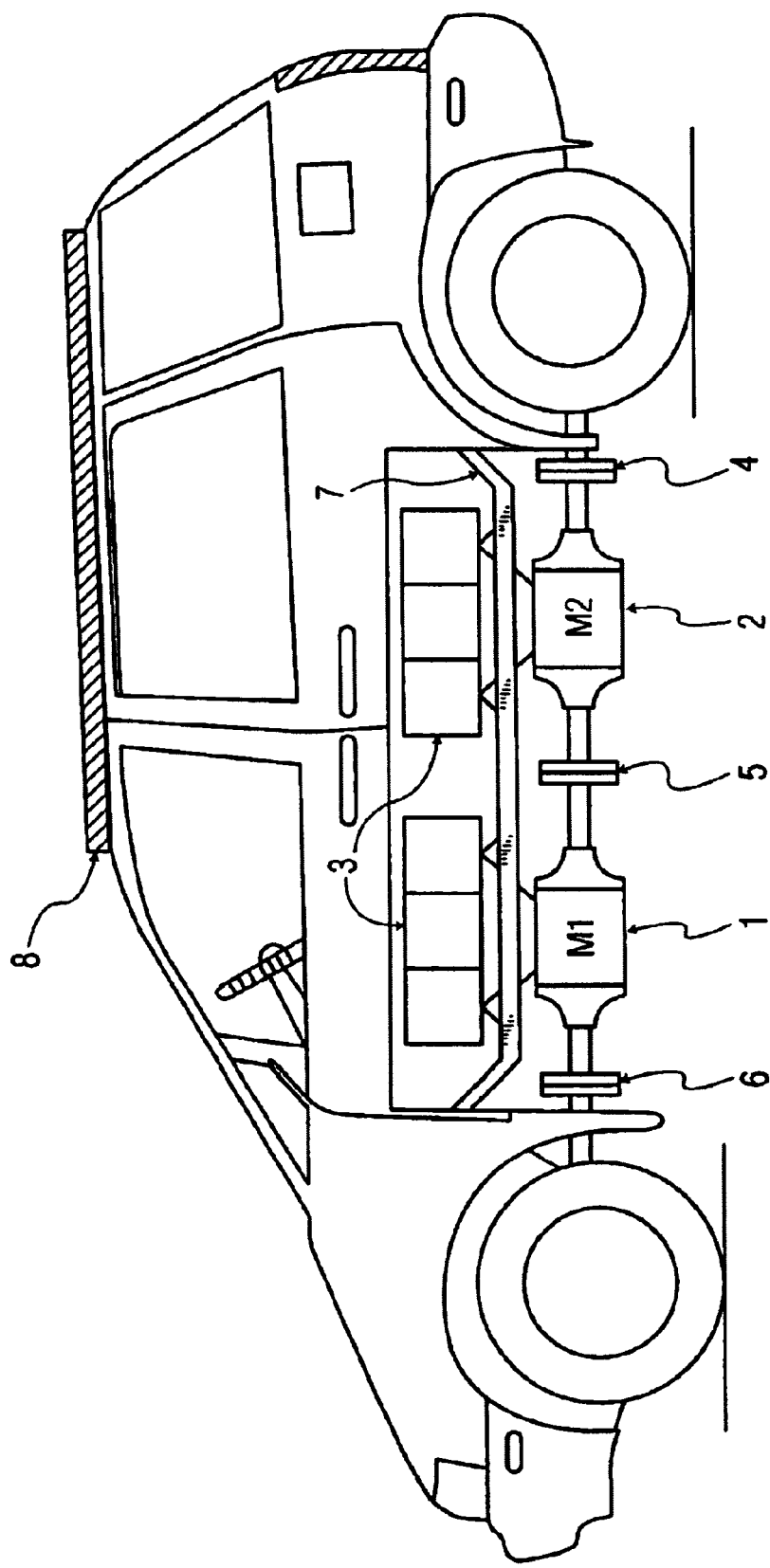

A schematic drawing (FIG. 3) showing connection and interconnection showing the rectifier (9), selector switch (10), three pole disconnect switch (11), battery (12), fuel cell (13), polarized receptacle (14), polarized attachment cap (15), forward and reverse switch (16).

Figure 4:
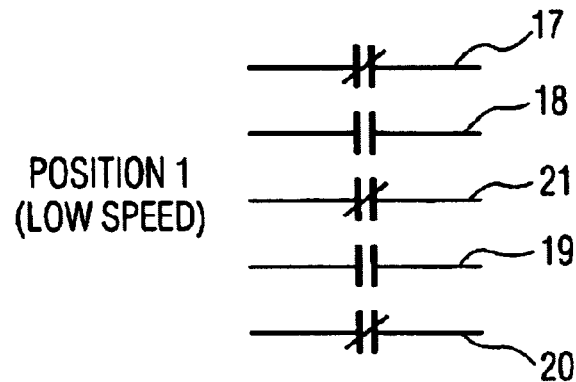
Figure 4:
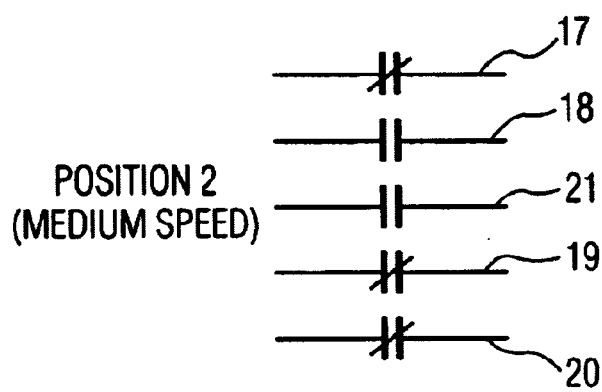
Figure 4:
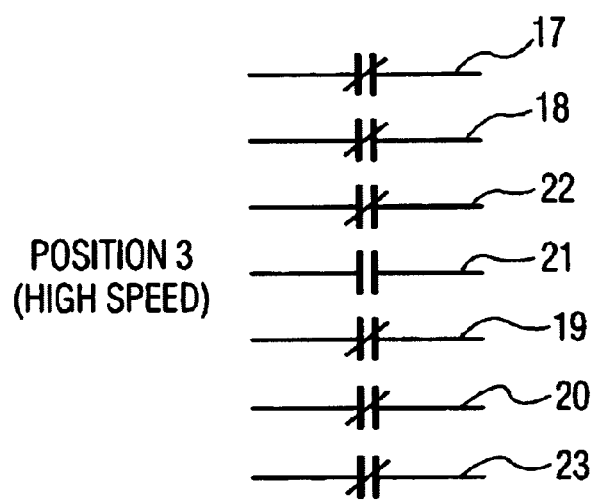

The drawing in FIG. 4 shows a three position low, medium and high speed with normally closed and nor open interlocks contained in the transition relay (13).

Figure 5:
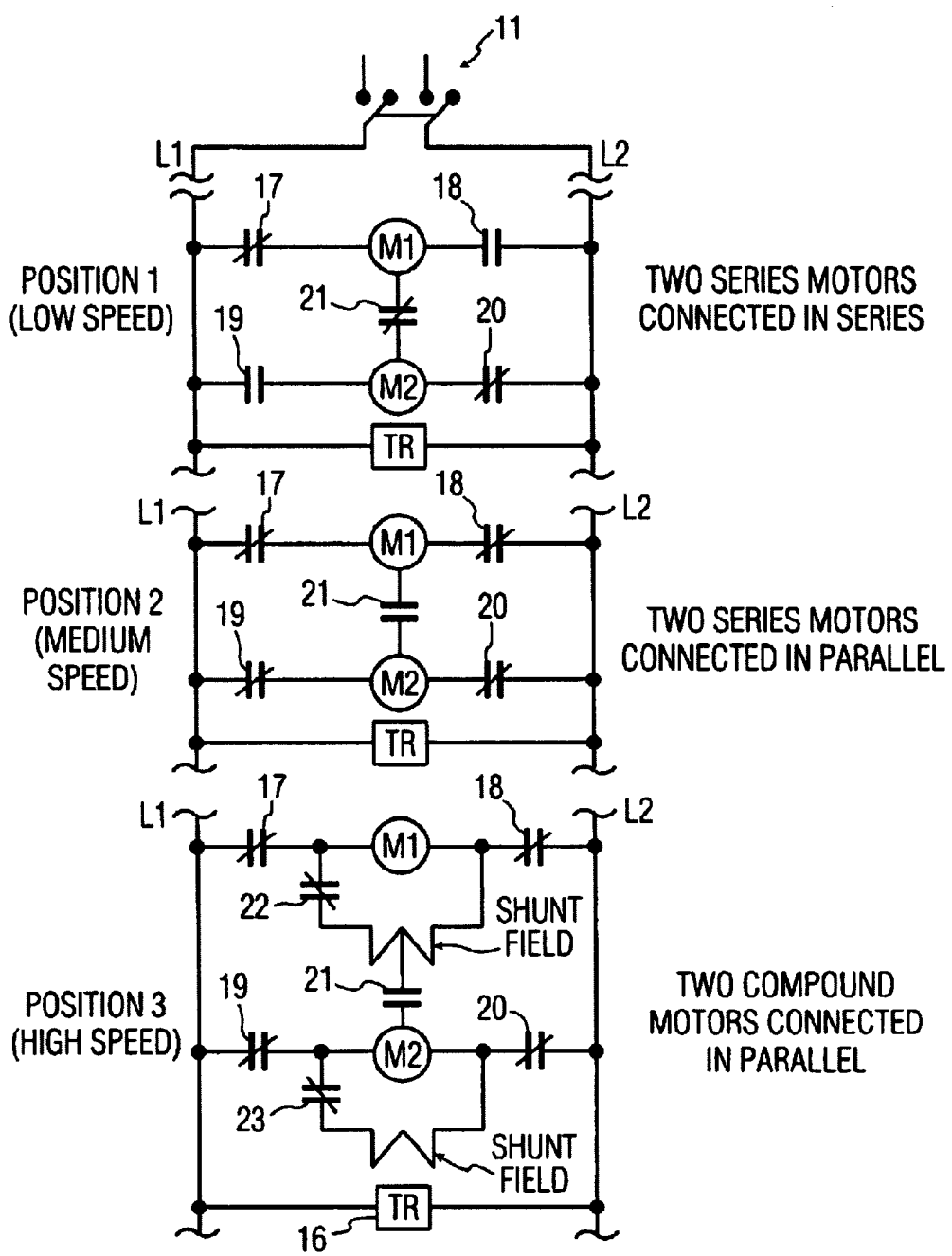

The drawing in FIG. 5 shows the interlocking at three speed positions repeating the interlocking shown on drawing it FIG. 4 with the symbols list defining the components in the FIG. 5 drawing.

DESCRIPTION OF THE EMBODIMENT

For a better understanding of the nature and object of our invention reference may be taken of the following detailed description of the drawing of the embodiment.

Figure 2:
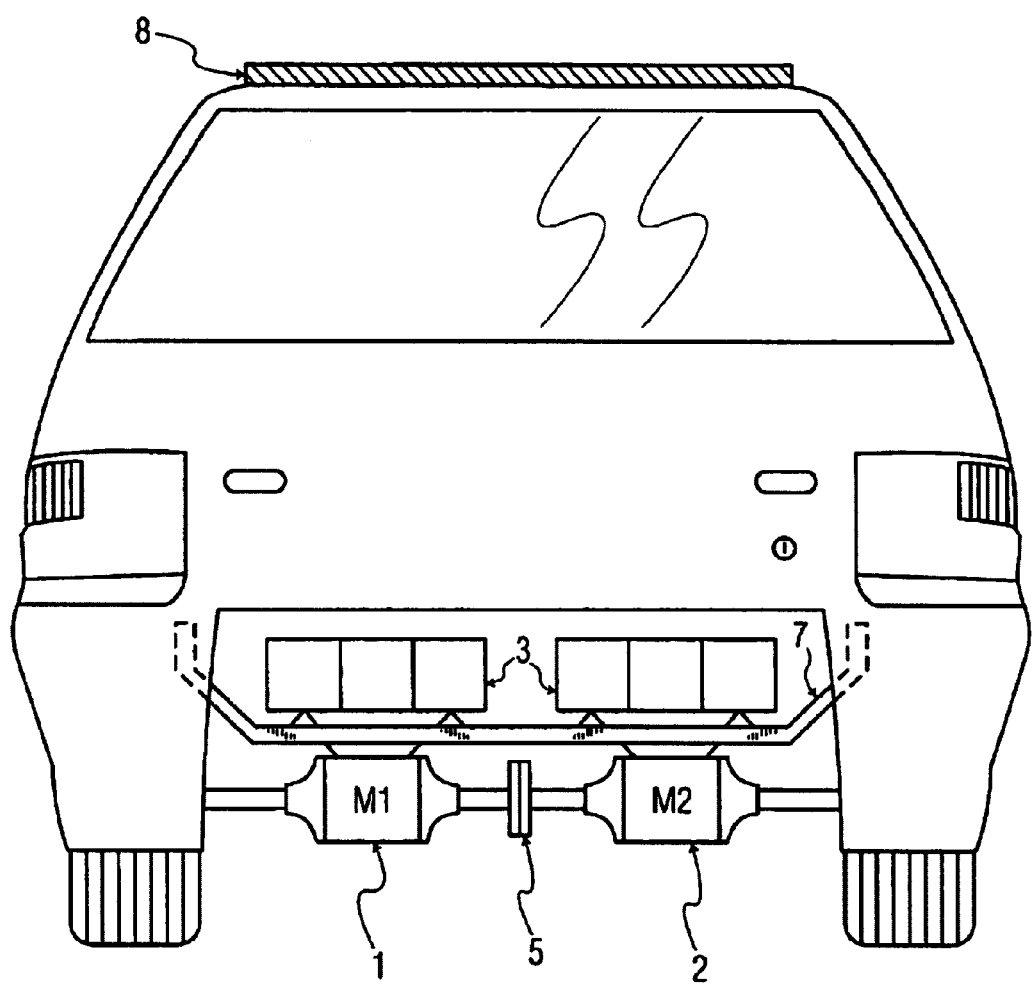
FIG. 2 shows a second embodiment of a motor vehicle in rear view with two motors connected to the vehicle rear axles.

FIG. 1 shows two motors M1 and M2 mounted and hooked-up in tandem with three connecting plates 4,5,6 and a mounting channel 7 common to both motors and a plurality of quickly removable and exchangeable batteries 3 mounted above the motors. This view indicates a two wheel and four wheel drive configuration by adjustments to the manually adjustable plates 4,6. FIG. 2 shows two motors M1 and M2 mounted in tandem with an axle shaft and one connecting plate 5. Two banks of batteries 3 are mounted on a supporting channel 7 bolted directly to the chassis of the vehicle. A solar panel 8 is shown on top of the roof of the vehicle.

Figure 3:
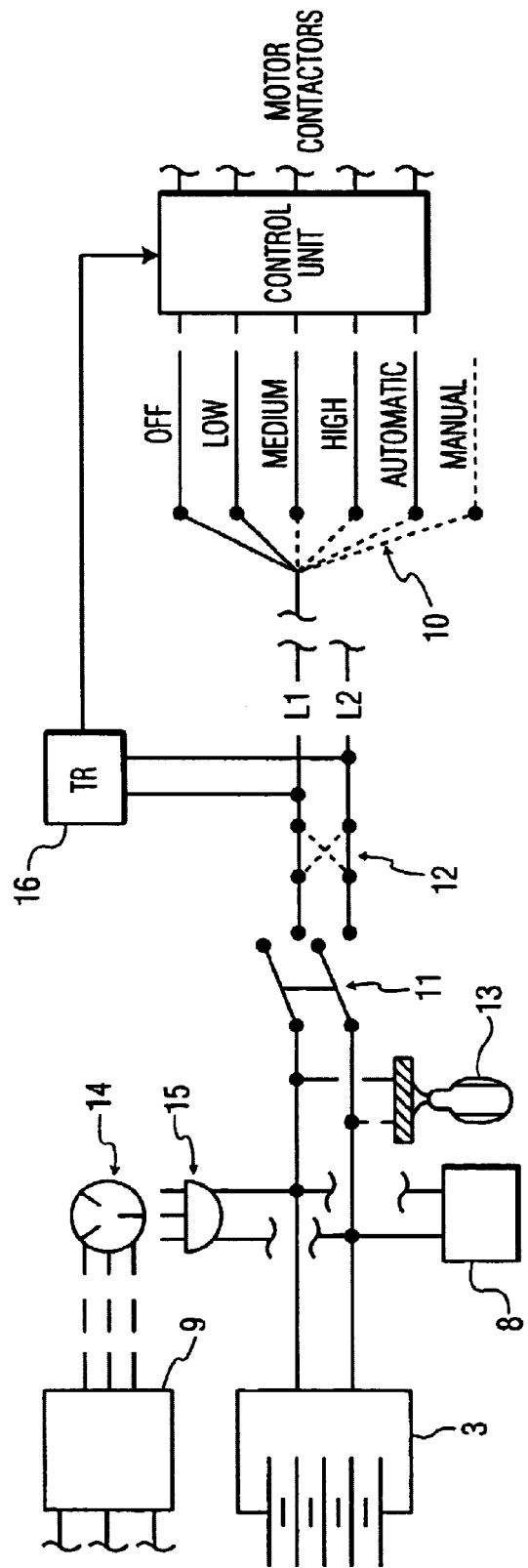

FIG. 3 is a schematic of the control system starting with the rectifier 9 connected by a polarized receptacle 14 with a polarized cap 15. The solar panel 8 is shown hard wire connected to a power bus L1 and L2 which interconnects the batteries 3, a fuel cell system 13, a power switch 11, a forward-reverse switch 12 and a transition relay 16. The quickly removable batteries 3 in FIG. 1 mounted above the motors plug and lock into the power bus to facilitate quick removal at exchange stations in exchange for fully charged batteries and/or hydrogen tanks (not shown) in connection with the fuel cell system 13.

A selector switch 10 operates through an electrical control unit to open and close a plurality of motor contactors in accordance with the program shown in FIG. 4. These contactors, 17–23, are connected between the power bus lines L1 and L2 and the series motors M1 and M2 in the manner shown in FIG. 5.

As may be seen in FIG. 5, the two series motors are connected in series for low speed operation and in parallel for medium speed operation. For high speed operation, the motors remain connected in parallel and power is applied to shunt fields of one or both motors turning them into compound motors. The speed range—low, medium, high—may be selected automatically by means of the transition relay 16 or manually by means of the selector switch 10.

Sequence of Manual Operation

Position 1

The closing of the two pole switch 11, and placing the selector switch 10 in the manual "low" position will cause motor contactors 17–21 to become energized as shown in FIG. 5, position 1, hence the two series motors M1 and M2 are connected in a series.

Position 2

To reach a higher medium speed from the 1 lower speed position, the selector switch 10 is moved to the "medium" speed position re-energizing motor contactors 17–21 as shown in FIG. 5, position 2, hence the two series motors connected in parallel.

Position 3

To reach a higher speed, from the medium speed position, the selector switch 10 is moved to the "high" position, as shown in FIG. 5, position 3, energizing the shunt fields in both motors M1 and 142 thus changing these two series motors to compound motors which remain in a parallel connection.

There has thus been shown and described a novel all electric power motor vehicle and battery and fuel tank exchange system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Drive apparatus for a motor vehicle, said apparatus comprising, in combination:
    (a) first and second DC electric series motors coupled mechanically to rotate together and adapted to be connected mechanically to drive wheels of the motor vehicle, said first motor having a first pair of electrical power terminals and a first shunt field winding, and said second motor having a second pair of electrical power terminals and a second shunt field winding;
    (b) two input power leads L1 and L2, adapted to be connected to a DC source of electrical power on the motor vehicle;
    (c) electric switch means for electrically connecting the input power leads L1 and L2 to the pairs of first and second power terminals and to the first and second shunt field windings of said motors, said switch means being operative, when in a first mode, to connect the power terminals of the first and second motors in series between the power leads L1 and L2 and to disconnect the shunt field windings; operative, when in a second mode, to connect the power terminals of the first and second motors in parallel between the power leads L1 and L2 and to disconnect the shunt field windings; and operative, when in a third mode, to connect the power terminals of the first and second motors in parallel and to connect the first and second shunt field windings thereof, to the power leads L1 and L2, whereby the motors operate in a first speed range when the switch means is in said first mode, in a second, higher speed range when the switch means is in said second mode, and in a third highest speed range when the switch means is in the third mode.

2. The drive apparatus recited in claim 1, wherein the first and second motors are mechanically connected in tandem to a drive shaft of the motor vehicle.

3. The drive apparatus recited in claim 1, wherein the first and second motors are mechanically connected in tandem to an axle of the motor vehicle.

4. The drive apparatus recited in claim 1, further comprising a DC source of electrical power coupled to said power leads L1 and L2.

5. The drive apparatus recited in claim 4, wherein said DC source includes a battery.

6. The drive apparatus recited in claim 5, wherein said battery is replaceable.

7. The drive apparatus recited in claim 4, wherein said DC source includes a solar panel.

8. The drive apparatus recited in claim 4, wherein said DC source includes a fuel cell.

9. The drive apparatus recited in claim 8, wherein said fuel cell is connected to a replaceable source of hydrogen.

* * * * *